United States Patent
Shibata et al.

(10) Patent No.: US 6,889,456 B2
(45) Date of Patent: May 10, 2005

(54) ILLUMINATION APPARATUS

(75) Inventors: Minoru Shibata, Nishikasugai-gun (JP); Osamu Yamanaka, Nishikasugai-gun (JP); Masanobu Muto, Nishikasugai-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/964,402

(22) Filed: Sep. 28, 2001

(65) Prior Publication Data

US 2002/0043012 A1 Apr. 18, 2002

(30) Foreign Application Priority Data

Sep. 28, 2000 (JP) .................................... 2000-296635

(51) Int. Cl.⁷ ............................................. G09F 13/18
(52) U.S. Cl. ......................................... 40/546; 40/544
(58) Field of Search ........................ 40/204, 205, 556, 40/544, 546, 547; 362/31

(56) References Cited

U.S. PATENT DOCUMENTS

| | | | | |
|---|---|---|---|---|
| 3,968,584 A | * | 7/1976 | Kingston | 362/31 X |
| 4,714,983 A | * | 12/1987 | Lang | 362/31 X |
| 4,903,172 A | * | 2/1990 | Schöniger et al. | 362/31 |
| 4,965,950 A | * | 10/1990 | Yamada | 40/546 |
| 5,036,243 A | * | 7/1991 | Cocks et al. | 40/545 X |
| 5,228,223 A | * | 7/1993 | Lan | 40/546 X |
| 5,641,221 A | * | 6/1997 | Schindele et al. | 40/544 X |
| 6,076,294 A | * | 6/2000 | Durbin | 40/544 |
| 6,308,444 B1 | * | 10/2001 | Ki | 40/546 |

* cited by examiner

Primary Examiner—Joanne Silbermann
(74) Attorney, Agent, or Firm—McGinn & Gibb, PLLC

(57) ABSTRACT

An LED light source is received in a groove portion provided in a light guide plate. The groove portion is covered with a base member, and the circumferential edge of the base member is bonded to the light guide plate. Concave portions or convex portions having desired shapes are provided in a surface opposite to a light emission observable surface of the light guide plate so as to form character portions.

16 Claims, 9 Drawing Sheets

ILLUMINATION APPARATUS

CROSS REFERENCE TO THE RELATED APPLICATION

The present application is based on Japanese Patent Application No. 2000-296635, which is incorporated herein by reference.

BACKGROUND OF THE INVENTION

1. Field of the Invention

The present invention relates to an illumination apparatus, and particularly relates to an illumination apparatus for displaying a specific shape with light emitted from an LED light source.

2. Description of the Related Art

An illumination apparatus in which characters, graphic symbols, etc. are displayed on a scuff plate or the like is known as a vehicle-interior illumination apparatus. For example, there is a scuff plate illumination apparatus configured by the combination of a display plate and a light source. The display plate is designed so that a character plate formed of a metal plate provided with light transmission holes having desired shapes (for example, an aluminum plate etched to be provided with through holes partially) is disposed on the light emission surface side of a light guide plate. The light source is disposed in opposition to a side surface of the light guide plate, or the like. In such an illumination apparatus, light emitted from the light source is introduced into the light guide plate through the side surface of the light guide plate, or the like, and thereafter radiated from the light emission surface of the light guide plate. Then, a part of the radiated light is radiated outward through the light transmission holes of the character plate. Thus, the desired shapes are displayed by the light from the light source.

An object of the present invention is to solve the following problem in such an illumination apparatus. That is, in the above-mentioned illumination apparatus, the character plate provided with desired light transmission holes is formed separately from the light guide plate. Therefore, dust, water, or the like, may enter a gap between the light guide plate and the character plate through the light transmission holes of the character plate. Thus, there is a fear that the surface of the light guide plate is damaged or polluted to cause unevenness in light emission, irregular reflection, reduction in light emission quantity, or the like. In addition, the light source is disposed at a distance from the display plate. Therefore, there is a fear that dust, water, or the like, enters a gap between the light source and the display plate. Further, the manufacturing cost of the character plate subjected to etching or the like is high so that there is a room for improvement in cost.

Another object of the present invention is to provide an illumination apparatus which is excellent in luminous efficiency and superior in durability. Further, another object of the present invention is to provide an illumination apparatus which can provide a novel decorative expression.

SUMMARY OF THE INVENTION

The present invention was developed to solve at least one of the foregoing objects. The present invention has the following configuration.

An illumination apparatus constituted by: an LED light source; a light guide plate having a groove portion for receiving the LED light source and wiring of the LED light source, and character portions constituted by concave (i.e., recessed or hollowed-out) portions or convex (i.e., raised or offset) portions with desired shapes, the character portions being provided on a back surface of the light guide plate; and a base member covering the back surface and the groove portion of the light guide plate, the base member being bonded to the light guide plate in a circumferential edge portion of the base member.

In the illumination apparatus configured thus, a part of light radiated from the LED light source and introduced into the light guide plate is reflected irregularly in outer circumferential portions (edge portions) of the character portions constituted by concave portions or convex portions. Thus, high-luminance light is observed in the outer circumferential portions of the character portions, so that the character portions, that is, the desired shapes are displayed (recognized). Since the desired shapes can be displayed by providing the concave portions or the convex portions in the light guide plate itself as described above, it is not necessary to provide a character plate separately. It is therefore possible to prevent unevenness in light emission, irregular reflection, reduction in light emission quantity, or the like, which might be caused by dust, water, or the like, if a character plate provided with light transmission holes were used as described above. In addition, it is possible to reduce the cost required for manufacturing such a character plate.

On the other hand, the LED light source is received in the groove portion provided in the light guide plate, and the groove portion is covered with a base member having its circumferential edge portion bonded to the light guide plate. The LED light source can be therefore prevented from being affected by dust or water. Thus, an illumination apparatus high in waterproof effect and superior in durability is arranged. In addition, since the LED light source is incorporated in the light guide plate, light emitted from the LED light source can be introduced into the light guide plate efficiently. Thus, an illumination apparatus high in luminous efficiency is provided.

DETAILED DESCRIPTION OF THE PREFERRED EMBODIMENTS

Respective constituents of the present invention will be described along with a scuff plate illumination apparatus 1 according to an embodiment of the present invention, by way of example. In use, the scuff plate illumination apparatus 1 is additionally provided on a side step portion of a car. Thus, the scuff plate illumination apparatus 1 displays desired shapes by means of light from an LED light source.

Figure 1:
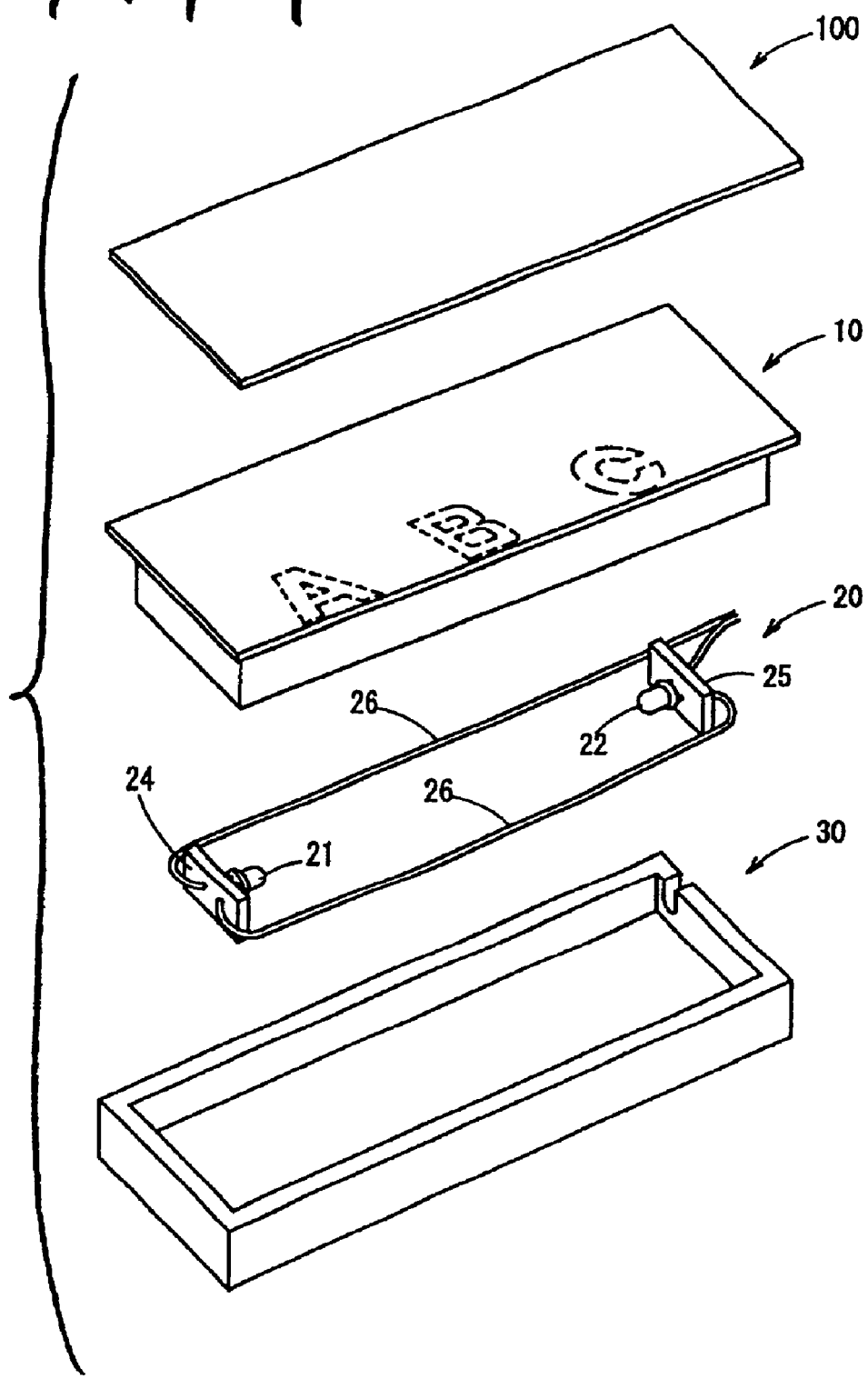
FIG. 1 is a perspective view showing the state where a scuff plate illumination apparatus 1 according to an embodiment of the present invention has not yet been assembled.
Figure 2:
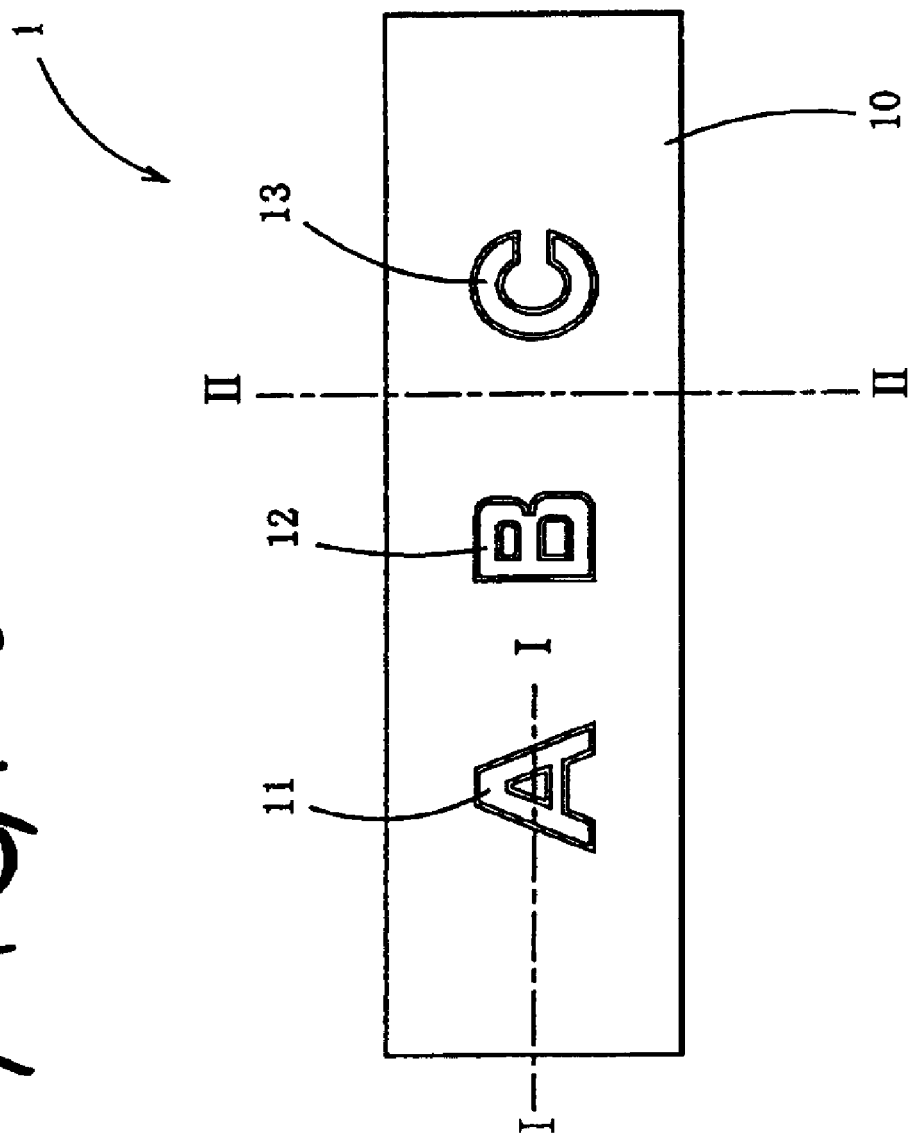
FIG. 2 is a plan view showing the scuff plate illumination apparatus 1 according to the embodiment in an assembled state, viewed from the light emission observable surface side.
Figure 3:
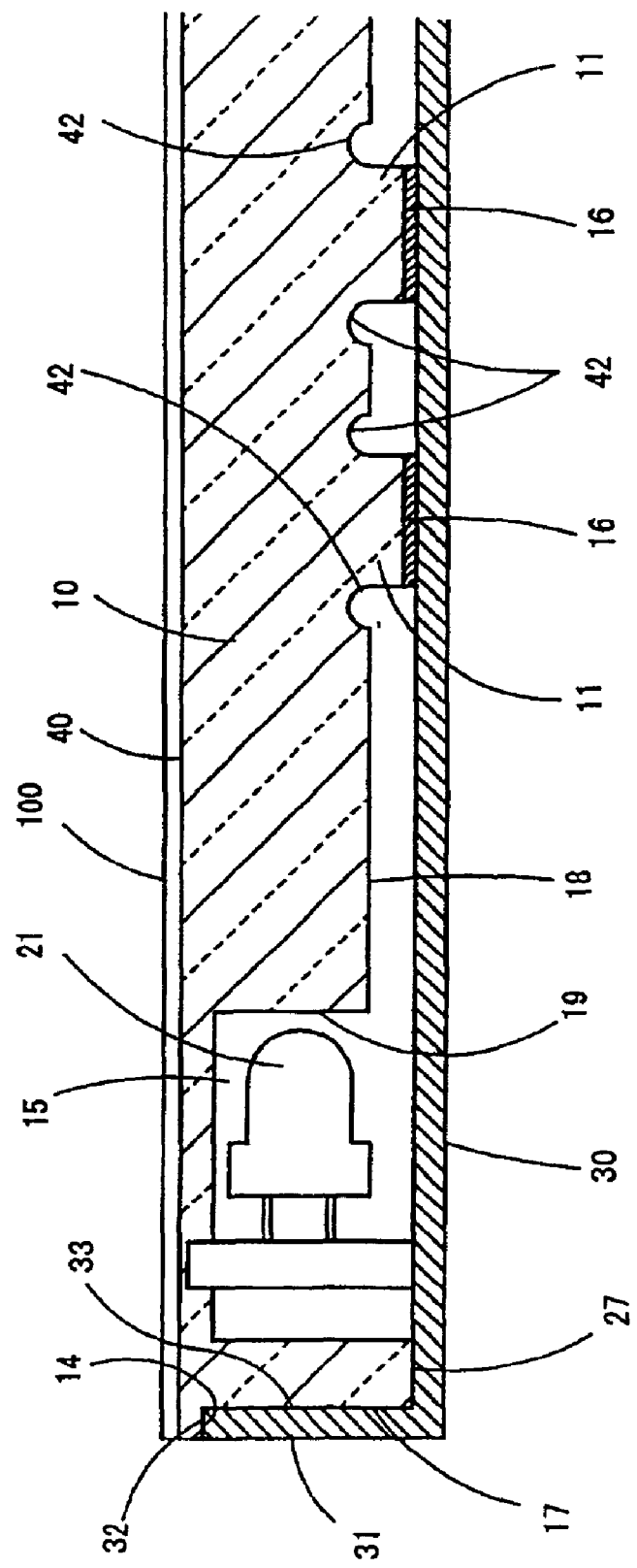
FIG. 3 is a sectional view taken on line I—I in FIG. 2.
Figure 4:
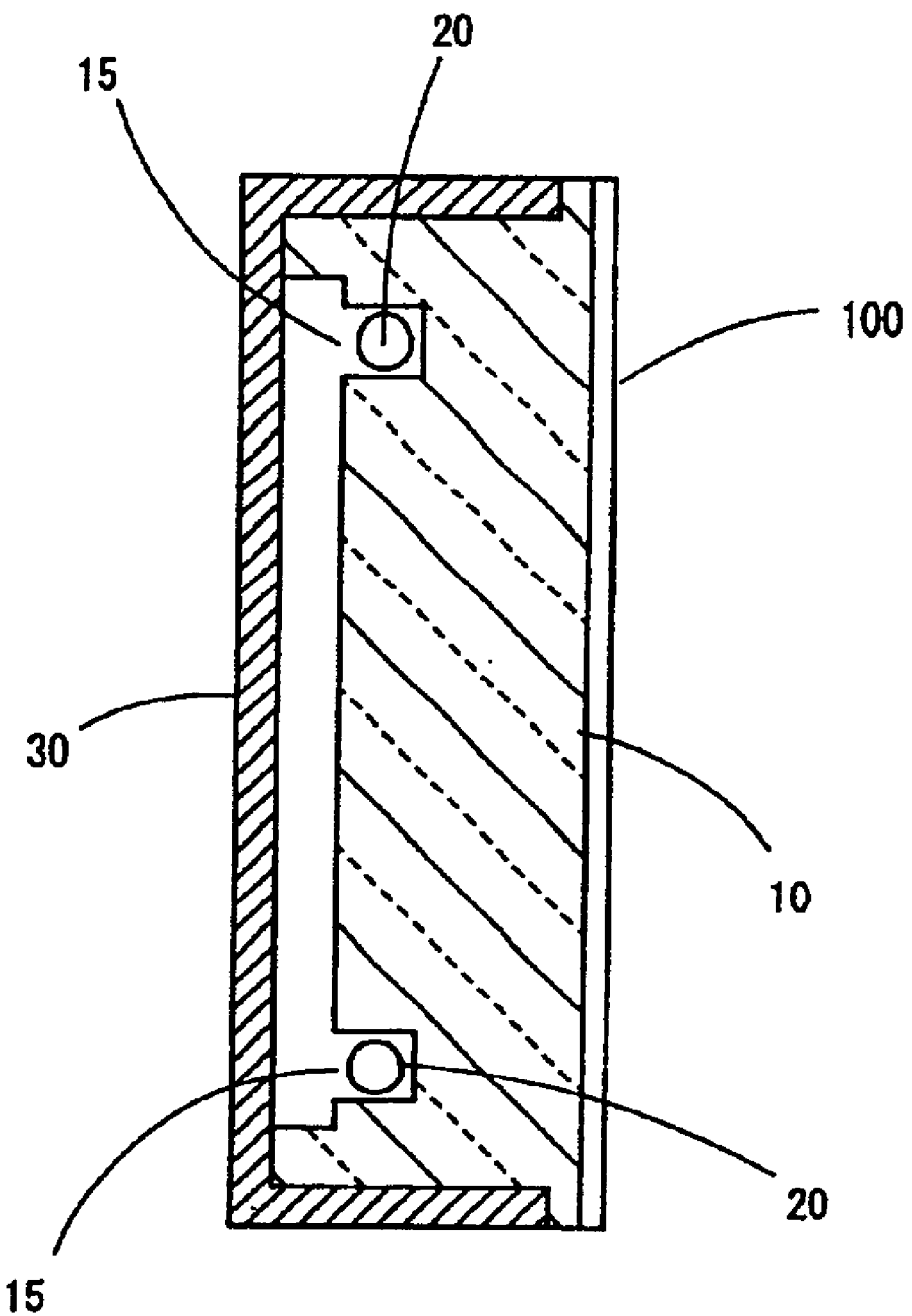
FIG. 4 is a sectional view taken on line II—II in FIG. 2.

FIG. 1 is a perspective view showing the scuff plate illumination apparatus 1 which has not yet been assembled. FIG. 2 is a plan view showing the scuff plate illumination apparatus 1 which has been assembled, viewed from the light emission observable surface side thereof. In addition, FIGS. 3 and 4 are sectional views taken on line I—I and line II—II in FIG. 2 respectively. The configuration of the scuff plate illumination apparatus 1 will be described below with reference to the drawings.

As shown in FIG. 1, the scuff plate illumination apparatus 1 is schematically constituted by a light guide plate 10, a light source unit 20, a case 30, and a PC sheet 100.

The light guide plate 10 is formed of a light permeable material. In this embodiment, polycarbonate resin is used as the material. Although the material forming the light guide plate 10 is not limited particularly, a material which is easy to work and which is superior in durability is preferably used. For example, acrylic resin, epoxy resin, glass, etc. other than polycarbonate resin may be used.

A groove portion 15 is provided in the back surface (opposite to the light emission observable surface) of the light guide plate 10 so as to follow substantially the circumferential wall of the light guide plate 10. The light source unit 20 is received in the groove portion 15 (see FIGS. 3 and 4).

In addition, character portions 11 to 13 constituted by convex (i.e., raised or offset) portions having desired shapes are formed in the back surface of the light guide plate 10. Preferably, a metal layer is provided on the surfaces of the convex portions. In this embodiment, a metal layer 16 is formed as a transfer layer of aluminum deposition. The material forming the metal layer is selected suitably in accordance with a desired mode of light emission. For example, metal such as silver, gold, aluminum or chrominum, an alloy of the metal, or the like, may be used.

However, the method for forming the metal layer is not limited to the above-mentioned manner. For example, a metal layer may be formed by evaporating metal or the like, by coating or printing resin, ink, or the like, containing metal or the like, by bonding a film or a tape containing metal or the like, and so on. A half mirror layer may be formed in place of the metal layer.

In place of the metal layer 16 formed on the surfaces of the character portions 11 to 13, a metal layer may be provided on the surface of a light guide plate back surface 18 except the character portions 11 to 13.

Grooves (recess portions) are preferably provided along the outer circumferences of the convex portions which form the character portions 11 to 13. The shapes and sizes of the grooves may be designed suitably. In this embodiment, semicircular grooves 42 are provided as shown in FIG. 3.

The light guide plate 10 shaped thus can be formed by a well-known method, for example, by injection molding or the like.

A hard coat treatment or the like is preferably applied to a light emission observable surface 40 of the light guide plate 10 in order to prevent the light emission observable surface 40 from damage, pollution, and so on. A hard-coated light permeable sheet may be bonded to the light emission observable surface 40. In this embodiment, the PC (polycarbonate) sheet 100 having its surface subjected to a hard coat treatment is bonded to the light emission observable surface 40.

The light source unit 20 is constituted by LEDs 21 and 22, substrates 24 and 25 to be mounted with the LEDs 21 and 22 respectively, and wires 26 for supplying electric power to the LEDs 21 and 22 respectively.

Round-type LEDs with blue luminescent color are used as the LEDs 21 and 22. The kind of LED is not limited to this type, but desired color and desired type (such as chip type) of LEDs may be selected suitably. In addition, different kinds of LEDs may be used in combination. The number of LEDs used may be determined in comprehensive consideration of the light quantity of the LED light source, the luminance of light to be radiated outward, and so on.

The light source unit 20 is connected to a not-shown power supply and a not-shown control circuit, so that the LEDs 21 and 22 can be turned on/off, for example, to interlock with opening/shutting of a door.

An illumination apparatus high in luminous efficiency is arranged by use of LEDs as a light source. In addition, LEDs are low in heat generation so that the influence of heat on the light guide plate 10 can be reduced. Therefore, LEDs are particularly suitable for light sources when the LEDs are incorporated in the light guide plate 10 as described in the present invention. In addition, since LEDs are longer in life than bulbs, the life of the illumination apparatus can be elongated. Further, there is an advantage that the luminescent color can be selected desirably.

The case 30 is made of a light permeable material. After the light source unit 20 is attached to the groove portion 15 of the light guide plate 10, the back surface of the light guide plate 10 is covered with the case 30. In this embodiment, a base member molded as a box-shaped case as shown in FIG. 1 is prepared as the case 30, and the back surface of the light guide plate 10 is covered with the case 30. A tabular sheet may be adopted. Polycarbonate resin, acrylic resin, epoxy resin, etc., can be used as the material forming the case 30.

Preferably, a light reflecting layer is provided on the inner surface of the case 30. For example, a metal layer is provided. The material of the metal layer is not limited particularly, but metal such as silver, gold, or aluminum, an alloy of the metal, or the like, may be used. Methods such as hot stamping, silk printing, painting, etc., may be adopted as the method for forming the metal layer. The case 30 may be formed of a light reflecting material. For example, resin in which metal, an alloy, or the like, has been dispersed, may be used as the material of the case 30. The surface of the case 30 has a metallic luster.

When a metal layer is formed on the surface of the case 30, or when the case 30 is formed out of a metal-containing material, a metal material different from the material forming the metal layer on the surfaces of the character portions in the light guide plate 10 is used. Thus, the display mode (display color) of the character portions 11 to 13 is distinguished from that of the other portion, so that the character portions 11 to 13 can be displayed emphatically. Alternatively, if a material having a similar color but in a different color tone is used, a sense of unity can be provided between the display mode of the character portions 11 to 13 and that of the other portion.

A circumferential edge portion 31 of the case 30 is hermetically bonded to the light guide plate 10. As a result, dust, water, or the like, can be prevented from entering the light guide plate 10 from the light emission observable surface 40 side. Thus, the light guide plate can be prevented from damage and pollution to the utmost. In addition, the influence of dust and water on the LED unit 20 can be also prevented to the utmost. In this embodiment, an end wall 32 of the circumferential edge portion 31 of the case 30 is hermetically bonded to a flange portion wall surface 14 provided in the circumferential edge portion of the light guide plate 10. Not to say, a wall surface 33 of the circumferential edge portion 31 may be bonded to a wall surface 17 of the light guide plate 10. On the other hand, when a tabular sheet is used as the case 30, the circumferential edge portion of the case 30 may be hermetically bonded to a wall surface 27 of the light guide plate 10. The method for bonding the case 30 with the light guide plate 10 is not limited particularly so long as the groove portion 15 for receiving the LED unit can be hermetically sealed substantially.

The case 30 and the light guide plate 10 can be hermetically bonded by use of an adhesive agent, a seal, or the like. Alternatively, the case 30 may be formed out of the same material (for example, polycarbonate resin) as the light guide plate 10. In this case, the case 30 and the light guide plate 10 can be bonded to each other by welding. A well-known method can be adopted as the welding method. For example, a plurality of mountain-like projections are first formed on the wall surface 14 of the light guide plate 10 made of polycarbonate. After the light guide plate 10 is covered with the case 30, high-frequency vibration in the left/right direction or in the up/down direction is applied to the wall surface 14 of the light guide plate 10. Thus, the projections formed on the wall surface 14 of the light guide plate 10 are melted so that the case 30 and the light guide plate 10 are welded.

Figure 5:
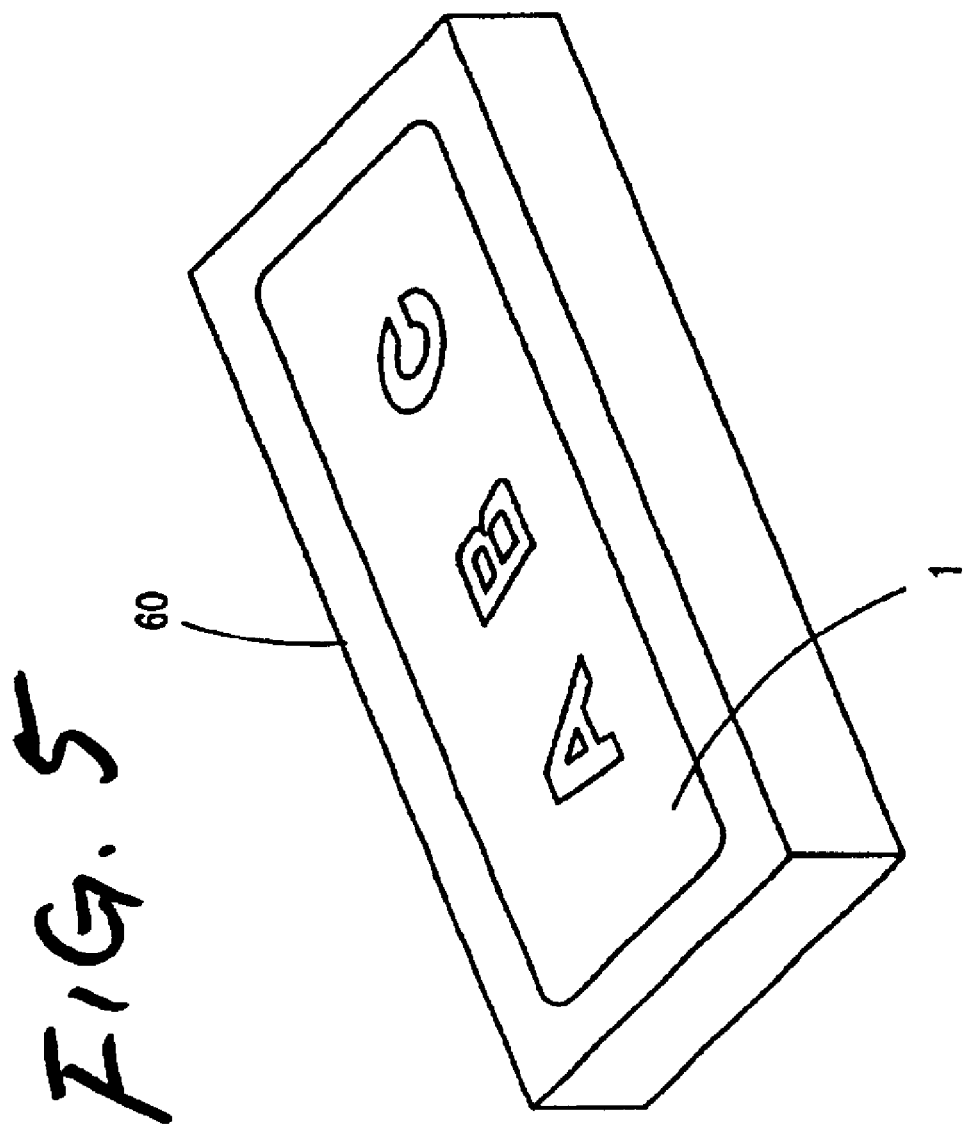
FIG. 5 is a perspective view showing the scuff plate illumination apparatus 1 to which a cover 60 has been attached.

In use, the scuff plate illumination apparatus 1 configured thus can be covered with a cover 60 made of a metal such as stainless steel (SUS) as shown in FIG. 5. By use of the cover 60, the scuff plate illumination apparatus 1 can be protected from external impact, and the light emission observable surface of the light guide plate 10 can be prevented from damage.

Next, the illumination mode of the scuff plate illumination apparatus 1 will be described with reference to FIG. 3. Incidentally, the case where the character portion 11 (character A) is displayed by light emitted from the LED 21 will be described by way of example, for the sake of convenience of description.

First, blue light emitted from the LED 21 is introduced into the light guide plate 10 through a light guide plate side surface 19. Of such light, light traveling to the character portion 11 is reflected by the metal layer 16 on the surface of the character portion 11, and thereafter radiated outward through the light emission observable surface 40 of the light guide plate 10. As a result, the character portion 11 is observed in blue light. On the other hand, light which does not travel to the character portion 11 is emitted through the light guide plate back surface 18, and thereafter reflected by the surface of the case 30. Such reflected light is taken into the light guide plate 10 through the light guide plate back surface 18 again, and finally radiated outward through the light emission observable surface 40 of the light guide plate 10. Such outward radiated light also exhibits blue. A part of the light is radiated directly outward through the light emission observable surface 40.

Here, the light traveling to the character portion 11 and the other light are radiated outward along different paths. Accordingly, the outward radiated light of the mentioned light and the other light is different in light emission modes such as luminance, color tone, etc., or in the manner how to be observed. Thus, the character A is displayed and recognized. In addition, when the light emitted from the LED 21 travels in the light guide plate 10, a part of the light is reflected irregularly by the groove portion 42 provided in the outer circumference of the character portion 11. Thus, the groove portion 42 emits light with high luminance so that the visibility of the character A is improved. In addition, the illumination mode becomes novel and superior in decorative properties.

Next, description will be made about the illumination mode of the scuff plate illumination apparatus 1 when it is bright around the scuff plate illumination apparatus 1 in the daytime or the like (when the LEDs are turned off). In this case, external light is introduced into the light guide plate 10 through the light emission observable surface 40 of the light guide plate 10. A part of the introduced light travels to the character portion 11, and is reflected by the metal layer 16. After that, the reflected light is radiated outward through the light emission observable surface 40. Thus, the character portion 11 is observed in the color of the metal layer 16. On the other hand, light which does not travel to the character portion 11 is emitted from the light guide plate back surface 18, and thereafter reflected by the surface of the case 30. Such reflected light is taken into the light guide plate 10 through the light guide plate back surface 18 again, and finally radiated outward through the light emission observable surface 40 of the light guide plate 10. Accordingly, the portion other than the character portion 11 is observed in the color of the case 30. As a result, the character portion 11 and the other portion are observed in the color of the metal layer 16 and the color of the case 30 respectively. Thus, the character A is displayed and recognized. In addition, in the same manner as that in the above-mentioned case where the LED 21 is turned on, the light traveling to the character portion 11 and the other light are radiated outward along different paths. Thus, the respective outward radiated light of the mentioned light and the other light becomes different in light emission modes such as luminance, color tone, etc., or in the manner how to be observed. A part of the light introduced from the light emission observable surface 40 is reflected irregularly by the groove portion 42. Thus, high luminance light is observed in the groove portion 42.

Although the character portions 11 to 13 are constituted by convex (i.e., raised) portions provided in the light guide plate 10 of the scuff plate illumination apparatus 1, concave (i.e., recessed or hollowed-out) portions having desired shapes may be provided in the back surface of the light guide plate so as to form character portions.

In addition, although the groove portion for receiving the LED unit 20 is provided in the back surface of the light guide plate in the scuff plate illumination apparatus 1, the groove portion may be provided in a side surface of the light guide plate. Also, in this case, if a box-like case as described above is used, the groove portion can be sealed substantially. Thus, the influence of dust, water, etc. on the LED light source can be prevented.

In addition, the groove portion maybe provided on the light emission observable surface side of the light guide plate. In this case, for example, a light permeable sheet is prepared separately, and the light emission observable surface of the light guide plate is covered with the light permeable sheet while the circumferential edge of the light permeable sheet is bonded to the light guide plate. Thus, there is shown a waterproof effect on the LED light source in the same manner as that in the above-mentioned case.

Although the scuff plate illumination apparatus 1 described above is arranged by use of the light guide plate 10 in which character portions constituted by convex portions (concave portions) having desired shapes are formed in the back surface (opposite to the light emission observable surface 40), the present invention may be applied to the illumination apparatus arranged by use of a light guide plate in which character portions constituted by concave portions or convex portions having desired shapes are formed in the light emission observable surface. A scuff plate illumination apparatus 2 arranged according to an embodiment of the present invention will be described by way of example. In use, the scuff plate illumination apparatus 2 is additionally provided on a side step portion of a car in the same manner as the scuff plate illumination apparatus 1. Incidentally, members the same as those in the scuff plate illumination apparatus 1 are referenced correspondingly, and description thereof will be omitted.

Figure 6:
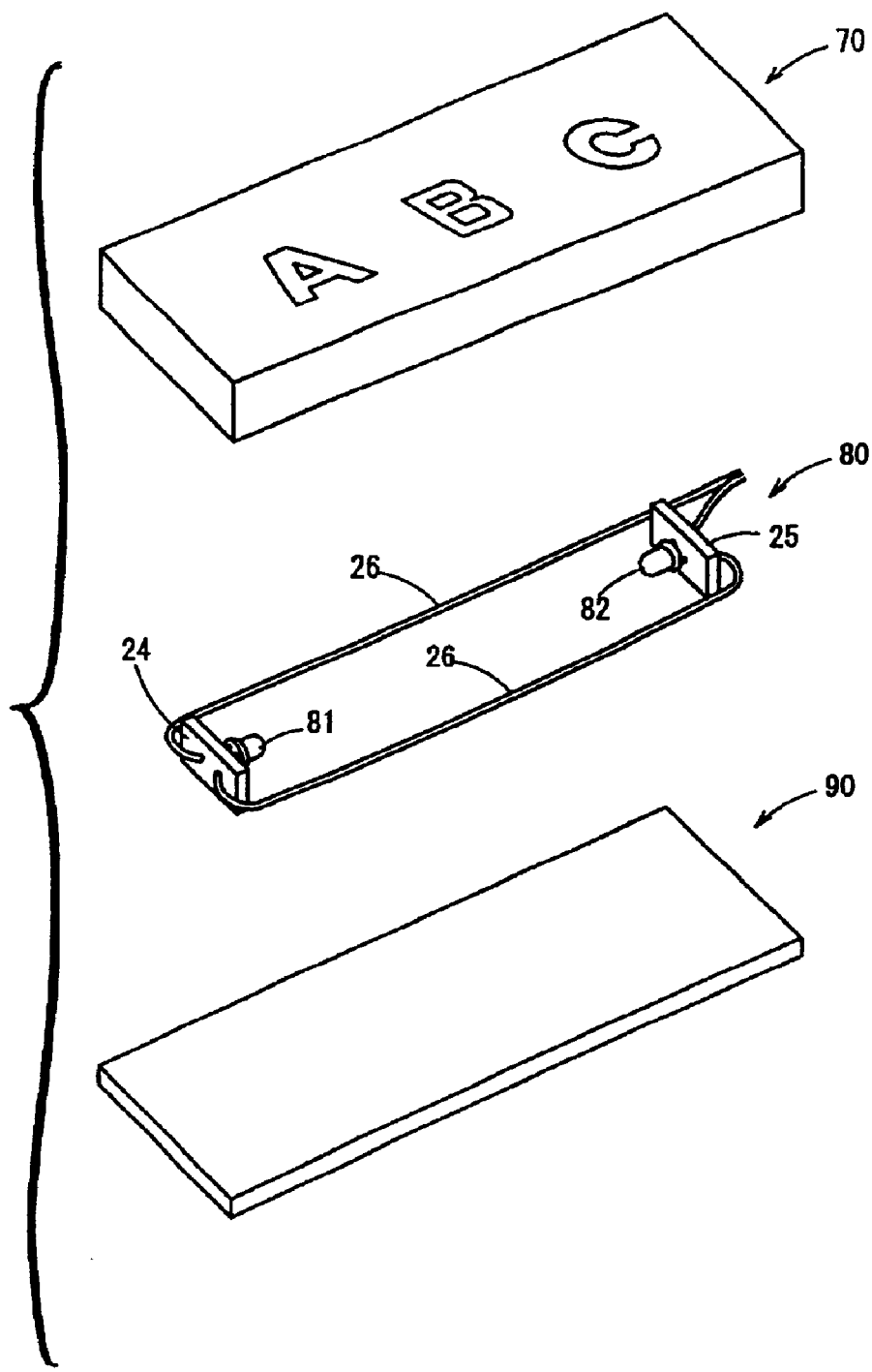
FIG. 6 is a perspective view showing the state where a scuff plate illumination apparatus 2 according to an embodiment of the present invention has not yet been assembled.
Figure 7:
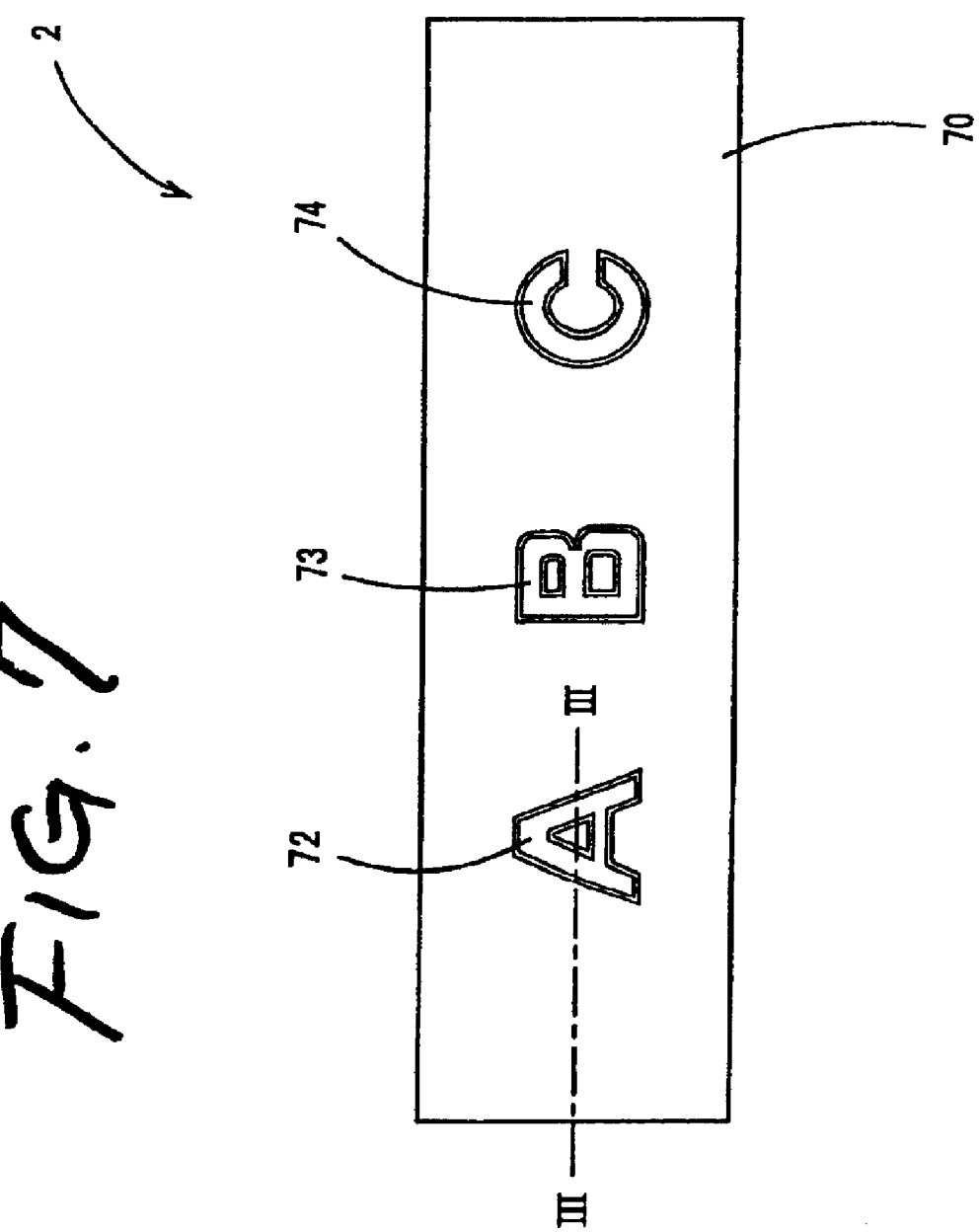
FIG. 7 is a plan view showing the scuff plate illumination apparatus 2 according to the embodiment in an assembled state, viewed from the light emission observable surface side.
Figure 8:
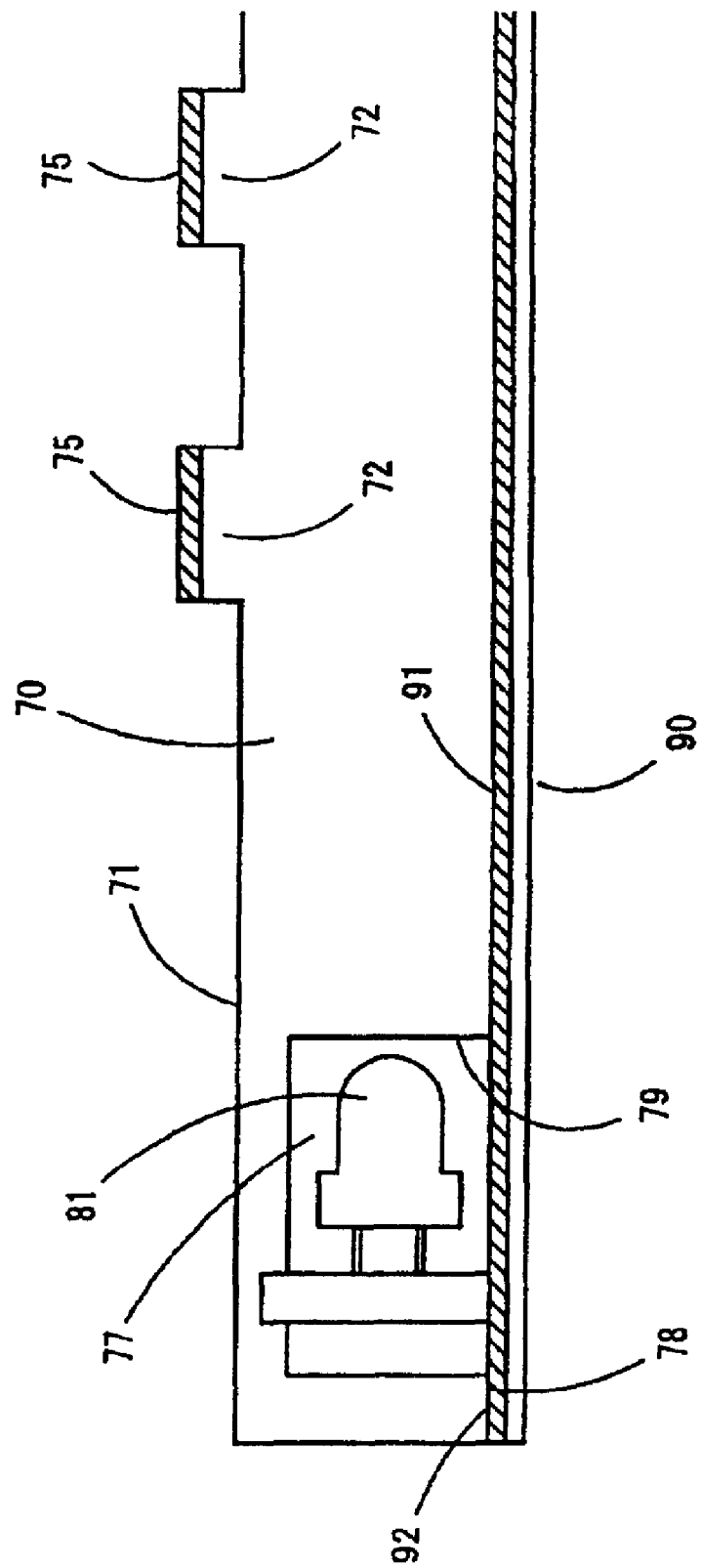
FIG. 8 is a sectional view taken on line III—III in FIG. 7.

FIG. 6 is a perspective view showing the scuff plate illumination apparatus 2 which has not yet been assembled. FIG. 7 is a front view after assembling. FIG. 8 is a sectional view taken on line III—III in FIG. 7.

As shown in FIG. 6, the scuff plate illumination apparatus 2 is constituted by a light guide plate 70, a light source unit 80 and a sheet 90.

In the light guide plate 70, character portions 72 to 74 constituted by convex portions are formed on a light emission observable surface 71. A metal layer 75 is provided on the surfaces of the character portions 72 to 74. The material forming the metal layer 75 is selected suitably in accordance with a desired light emission mode. For example, metal such as silver, gold or aluminum, an alloy of the metal, or the like may be used. In this embodiment, the metal layer 75 is formed as a transfer layer of aluminum deposition. The method for forming the metal layer 75 is not limited to the above-mentioned manner. For example, a metal layer 75 can be formed by evaporating metal or the like, by coating or printing resin, ink, or the like, containing metal or the like, by bonding a film or a tape containing metal or the like, and so on. A half mirror layer may be formed in place of the metal layer 75. The character portions may be formed by concave portions provided on the light emission observable surface of the light guide plate 70.

A groove 77 for receiving an LED unit is formed in the back surface of the light guide plate 70 in the same manner as that in the scuff plate illumination apparatus 1.

The sheet 90, which serves as a base member of the invention, is formed of a tabular, light permeable resin sheet having a surface on which a metal layer 91 made of gold is formed by silk printing. The shape and material of the sheet 90, the material of the metal layer and the method for forming the metal layer are not limited to those described above. A circumferential edge portion 92 of the sheet 90 is hermetically bonded to a wall surface 78 of the light guide plate 70. The bonding method is similar to that for the scuff plate illumination apparatus 1.

Round-type LEDs with amber luminescent color are used as the LEDs 81 and 82. The luminescent color and the type of LEDs 81 and 82 are not limited to those. Desired luminescent color and desired type of LEDs may be selected suitably.

Description will be made about the illumination mode of the scuff plate illumination apparatus 2 configured thus. Incidentally, the case where the character portion 72 (character A) is displayed by light emitted from the LED 81 will be described by way of example, for the sake of convenience of description.

First, light emitted from the LED 81 is introduced into the light guide plate 70 through a light guide plate side surface 79. The light traveling in the light guide plate 70 is reflected by the metal layer 91 on the surface of the sheet 90. Then, the reflected light travels toward the light emission observable surface 71. Of such light, light reaching the character portion 72 is reflected by the metal layer 75. Therefore, no light is radiated outward through the surface of the character portion 70. On the other hand, the other light is radiated outward through the light emission observable surface 71. As a result, amber color is observed from the light emission observable surface 71 except the character portion 72 so that the character portion 72 is observed to be transferred onto the sheet 90. Thus, the character A is displayed and recognized. In addition, light is reflected irregularly in the edge portion of the character portion 72 so that the edge portion is observed to emit light with high luminance. Apart of the light emitted from the LED 81 is radiated outward directly through the light emission observable surface 71.

Next, description will be made about the illumination mode of the scuff plate illumination apparatus 2 when it is bright around the scuff plate illumination apparatus 2 in the daytime or the like (when the LEDs are turned off). In this case, external light is introduced into the light guide plate 70 through the light emission observable surface 71 except the character portion 72. The introduced light is reflected by the metal layer 91 on the surface of the sheet 90 so that the traveling direction of the light is changed. Then, the reflected light is radiated outward through the light emission observable surface 71 except the character portion 72. Thus, the light reflected by the metal layer 75 on the surface is observed directly in the character portion 72. Consequently, the character portion is observed in the color of the metal layer 75, that is, in silver, while the other portion is observed in the color of the metal layer 91 on the surface of the sheet 90, that is, in gold.

Thus, when it is bright around the scuff plate illumination apparatus 2 in the daytime or the like, the character portion 72 is recognized in a color different from that of the other portion. On the other hand, when the LED 81 is turned on, the portion except the character portion 72 is displayed by the light of the LED 81 so that the character portion 72 is recognized. Thus, according to the illumination apparatus, a novel decorative expression can be made.

Although the metal layer 75 is provided on the surface of the character portion 72 in this embodiment, a similar metal layer may be provided on the light emission observable surface 71 except the character portion 72 in place of the metal layer 75. Also in such a configuration, in the same manner as that in the above-mentioned case, the character portion and the other portion in the light emission observable surface can be observed in different light emission modes when the LED 81 is turned on. Thus, the character can be displayed and recognized. A half mirror layer may be formed in place of such a metal layer.

Groove portions may be provided in the outer circumferences of the character portions 72 to 74 provided in the light emission observable surface 71 of the light guide plate 70 in the same manner as that in the scuff plate illumination apparatus 1. In such a case, light emission with high luminance can be obtained from the groove portions by turning on of the LEDs so as to show a novel decorative effect.

Next, a scuff plate illumination apparatus 3, which is another embodiment of the invention, will be described with reference to FIG. 9. Incidentally, members the same as those in the scuff plate illumination apparatus 1 are referenced correspondingly, and description thereof will be omitted.

Figure 9:
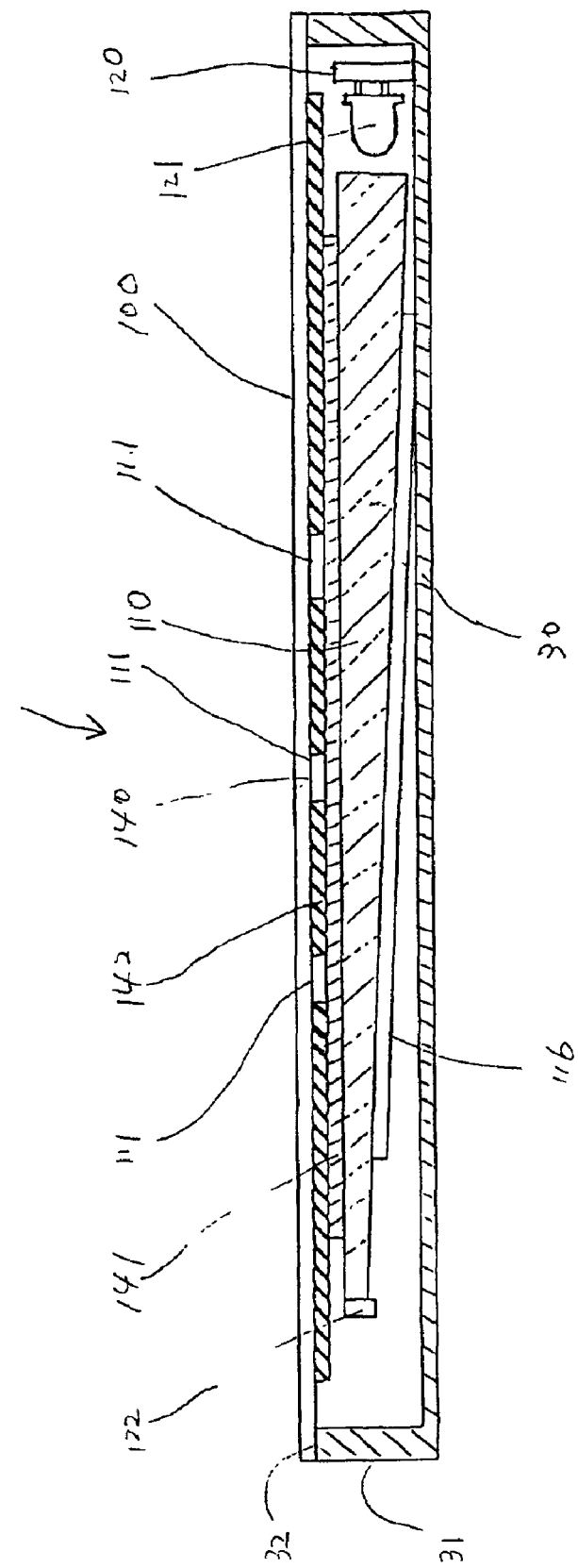
FIG. 9 is a sectional view showing the scuff plate 3 according to another embodiment of the invention.

In this embodiment, as shown in FIG. 9, the scuff plate illumination apparatus 3 is schematically constituted by a light guide plate 110, a light source unit 120, a case 30, and a PC sheet 100. The light guide plate 110 and a light source unit 120 are provided within the case 30. An end wall 32 of the circumferential edge portion 31 of the case 30 is directly bonded to the circumferential edge portion of the PC sheet 100, thereby the light guide plate 110 and the light source unit 120 are hermetically sealed and received in the case 30.

In this embodiment, the light source unit has a single LED 121. On the opposite side of the LED 121, there is provided a reflection mirror 122. By reflecting light emitted from the LED 121 with the reflection mirror 122, a light source unit 120 performs a similar effect to the light source unit 20 of the foregoing scuff plate illumination apparatus 1, even though only one LED 121 is provided in the light source unit 120. For the LED 121, desired luminescent color and desired type of LEDs may be selected suitably.

A light diffusion layer 116 is formed on the back side of the light guide plate 110. The light diffusion layer 116 is slanted so as to obliquely face to the light source 120 and radiate light from the light source 120 in a direction where light emission observable surface 140 are provided. Here, the light diffusion layer 116 is provided with metal layers as described in the first and second embodiments. That is, the material forming the light diffusion layer 116 is not limited particularly, but metal such as silver, gold, or aluminum, an alloy of the metal, or the like, may be used. Further, as for the method for forming the light diffusion layer, methods such as hot stamping, silk printing, painting, etc., may be adopted.

In a side of the light emission observable surface, half transparent layer 141 (half mirror layer) is provided on a surface of the light guide plate 110, and a display plate 142 is provided on the half transparent layer 141. The display plate 142 has character portions 111. Such a display plate can be made of aluminum or the like by known simplified machining methods.

The PC sheet 100 is disposed on the display plate 142. As described above, the PC sheet 100 is hermetically bonded directly to the circumferential portion of the case 30, thereby the light guide plate 110 and the light source unit 120 are hermetically sealed and received in the case 30. As a result, the influences of dust, water, etc. as well as physical damage on the display plate 142, the light source unit 120 and the light guide plate 110 can be prevented.

Although, in this embodiment, the character portions 111 are formed by providing with the display plate 142, such the character portions may be formed by providing concave portions or convex portions having metal portions with desired shapes on the back surface of the light guide plate, as described in the first and second embodiments. Further, although the half mirror layer 141 is formed between the display plate 142 and the light guide plate 110 in this embodiment, the invention can be embodied without providing such a half mirror layer.

Although the scuff plate illumination apparatuses 1, 2 and 3 to which the present invention is applied have been described above by way of example, the present invention is applicable also to other automobile interior illumination apparatuses (for example, a plate-like illumination apparatus to be attached to a door portion, a linear illumination apparatus to be attached to a pillar portion, and so on). In addition, the present invention is not limited to such automobile illumination apparatuses, but applicable also to illumination apparatuses such as display plates in various kinds of vehicles, illumination apparatuses such as display plates in the interiors of houses, display plates in the exteriors of houses, such as door plates, and so on.

The present invention is not limited to the above description of the embodiments of the present invention. Various modifications are also included in the present invention without departing from the scopes of the claims of the invention and within the scope easy to be conceived by those skilled in the art.

The followings are disclosed.

(10) An illumination apparatus of the invention, wherein a light reflection layer is formed on a light emission observable surface of the base member.

(11) An illumination apparatus according to the above (10), wherein the light reflection layer is constituted by a metal layer.

(20) An illumination apparatus constituted by:
an LED light source;
a light guide plate having a groove portion for receiving the LED light source and wiring of the LED light source, and character portions constituted by concave portions or convex portions with desired shapes, the character portions being provided on a light emission observable surface of the light guide plate; and
a base member covering a back surface and the groove portion of the light guide plate, the base member being bonded to the light guide plate in a circumferential edge portion of the base member.

(21) An illumination apparatus according to the above (20), wherein the groove portion is formed in the back surface of the light guide plate.

(22) An illumination apparatus according to the above (20) or (21), wherein the light guide plate and the base member are made of one and the same material, and the light guide plate and the base member are bonded to each other by welding.

(23) An illumination apparatus according to any one of the above (20) through (22), wherein the character portions are constituted by convex portions, and a second groove portion is provided in the light emission observable surface of the light guide plate so as to follow outer circumferences of the convex portions.

(24) An illumination apparatus according to any one of the above (20) through (23), wherein a metal layer is formed on the character portions, or on the light emission observable surface of the light guide plate except portions where the character portions are formed.

(25) An illumination apparatus according to any one of the above (20) through (24), wherein a light emission observable surface of the base member has light reflection property.

(26) An illumination apparatus according to any one of the above (20) through (25), wherein the illumination apparatus is a scuff plate installed on a side step portion of a car.

(30) An illumination apparatus according to the above (25), wherein a light reflection layer is formed on the light emission observable surface of the base member.

(31) An illumination apparatus according to the above (30), wherein the light reflection layer is constituted by a metal layer.

(32) An illumination apparatus according to any one of the above (20) through (23), the above (26), the above (30) and (31), wherein a half mirror layer is formed on the character portions, or on the light emission observable surface of the light guide plate except portions where the character portions are formed.

What is claimed is:
1. An illumination apparatus comprising:
an LED light source;

a light guide plate having a groove portion for receiving said LED light source, and character portions formed by convex portions with desired shapes, said character portions being provided on a back surface of said light guide plate; and a base member covering said back surface and said groove portion of said light guide plate, said base member being bonded to said light guide plate in a circumferential edge portion of said base member, wherein said convex portions are formed as a raised portion of said light guide plate.

2. An illumination apparatus according to claim 1, wherein said groove portion is formed in said back surface of said light guide plate.

3. An illumination apparatus according to claim 1, wherein said light guide plate and said base member comprise a same material, said illumination apparatus further comprising:

a portion of said material being welded together for bonding said light guide plate and said base member together.

4. An illumination apparatus according to claim 1, wherein said character portions includes convex portions, and a second groove portion is provided in said back surface of said light guide plate so as to follow outer circumferences of said convex portions.

5. An illumination apparatus according to claim 1, wherein a metal layer is formed on said character portions or on said back surface of said light guide plate except portions where said character portions are formed.

6. An illumination apparatus according to claim 1, wherein a light emission observable surface of said base member has a light reflection property.

7. An illumination apparatus according to claim 1, wherein said illumination apparatus comprises a scuff plate that will be installed on a side step portion of a car.

8. An illumination apparatus comprising:

an LED light source;

a light guide plate having a groove portion for receiving said LED light source, and character portions formed by convex portions with desired shapes, said character portions being provided on a back surface of said light guide plate; and a base member covering said back surface and said groove portion of said light guide plate, wherein said base member is hermetically bonded to said light guide plate in a circumferential edge portion of said base member, thereby hermetically sealing said LED light source, and wherein said convex portions are formed as a raised portion of said light guide plate.

9. An illumination apparatus according to claim 8, wherein said groove portion is formed in said back surface of said light guide plate.

10. An illumination apparatus according to claim 8, wherein said light guide plate and said base member comprise a same material, said illumination apparatus further comprising a length of said material being welded together for bonding said light guide plate and said base member together.

11. An illumination apparatus according to claim 8, wherein said character portions include convex portions, and a second groove portion is provided in said back surface of said light guide plate so as to follow outer circumferences of said convex portions.

12. An illumination, apparatus according to claim 8, wherein a metal layer is formed on said character portions or on said back surface of said light guide plate except portions where said character portions are formed.

13. An illumination apparatus according to claim 8, wherein a light emission observable surface of said base member has a light reflection property.

14. An illumination apparatus according to claim 8, wherein said illumination apparatus comprises a scuff plate that will be installed on a side step portion of a car.

15. An illumination apparatus according to claim 8, wherein a flange portion is formed in a circumferential edge portion of said light guide plate, and an end wall of said circumferential edge portion of said base member is bonded to said flange portion.

16. An illumination apparatus according to claim 8, further comprising:

a light permeable sheet member provided on an emission observable surface side of said light guide plate.

* * * * *